United States Patent [19]
Nelson

[11] 4,132,665
[45] Jan. 2, 1979

[54] WIRE FEED FUNNEL

[76] Inventor: John E. Nelson, 3216 W. Opal, Pasco, Wash. 99301

[21] Appl. No.: 872,114

[22] Filed: Jan. 25, 1978

[51] Int. Cl.² ............................................. B65M 59/00
[52] U.S. Cl. .............................................. 254/134.3 R
[58] Field of Search ............... 254/134.3 R, 134.3 FT; 74/135; 141/331

[56] References Cited
U.S. PATENT DOCUMENTS

| | | | |
|---|---|---|---|
| 3,005,620 | 10/1961 | Trunnell | 254/134.3 R |
| 3,160,394 | 12/1964 | Hunter et al. | 254/134.3 R |

*Primary Examiner*—Robert C. Watson
*Attorney, Agent, or Firm*—William C. Babcock

[57] ABSTRACT

An improved wire feed funnel adapted for guiding wire into the interior of a conduit comprising sheet plastic structure of a substantially triangular planform curled during molding to a split conical surface. Attached proximate the adjacent edges of the curled conical surface are two retaining brackets which are deployable to engage the lid attachment of a junction box when the conical surface is inserted by its apex into the conduit opening extending therein.

3 Claims, 4 Drawing Figures

WIRE FEED FUNNEL

BACKGROUND OF THE INVENTION

1. Field of the Invention

The present invention relates to wire feeding devices, and more particularly to guides for facilitating the insertion of wires into a conduit.

2. Description of the Prior Art

The use of guides in drawing electrical wires through a conduit has been known in the past. Most frequently wires are fed into a conduit end secured on the interior of a junction box. These sharp conduit ends are often a source damage to the wire insulation as the wire is drawn and to avoid this damage funnel-like structures were provided in the past, variously insertable into the conduit end to shield the wire from damage. As an additional feature some of these prior art funnels included long necks to reduce bending radius for the wire drawn. Thus the typical prior art guide includes a laterally closed surface tied to a circular collar requiring the passing of the wire ends therethrough during installation and removal.

In some instances, however, wire leads pass through a junction box without any connection and the use of a circular guide is therefore inappropriate since the strand will have to be cut in order to withdraw the guide. Furthermore such prior guides entail elaborate installation techniques and relatively complex structures all leading to increase costs in installing the electrical wires and increase cost in producing the guide itself.

SUMMARY OF THE INVENTION

Accordingly it is the general purpose and object of the present invention to provide an inexpensively produced wire guide which can be installed around a continuous wire strand without disruption.

Yet additional objects of the invention are to provide a wire guide having attachment fixtures formed thereon for the engagement of the guide in a junction box.

Yet additional objects of the invention are to provide a wire guide which is adapted for use with conduits of various dimensions.

Briefly these and other objects are accomplished within the present invention by convolving a substantially triangular plastic sheet into the curled shape of a conical surface, the adjacent edges of the sheet being provided with retaining brackets for engaging the structure of a junction box. The apex of the cone thus formed is cut off at the desired level of insertion, thus accommodating the various conduit openings and the wire strands inserted therein. When installed the foregoing funnel structure is dimensioned to extend into the conduit end exposed in a junction box and the brackets being aligned to engage the securing structure normally found therein.

DESCRIPTION OF THE SPECIFIC EMBODIMENT

Figure 1:
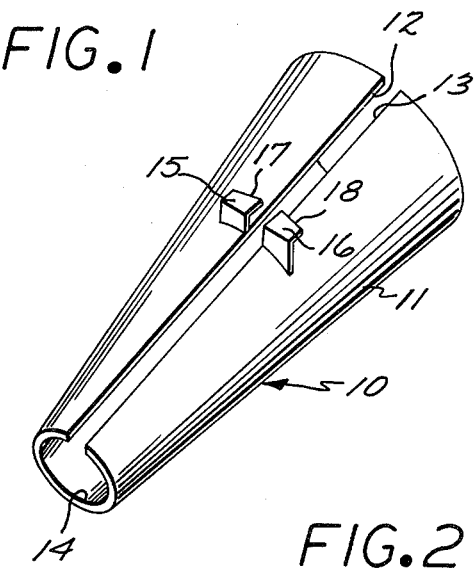
FIG. 1 is a perspective illustration of a split wire funnel constructed according to the present invention.
Figure 2:
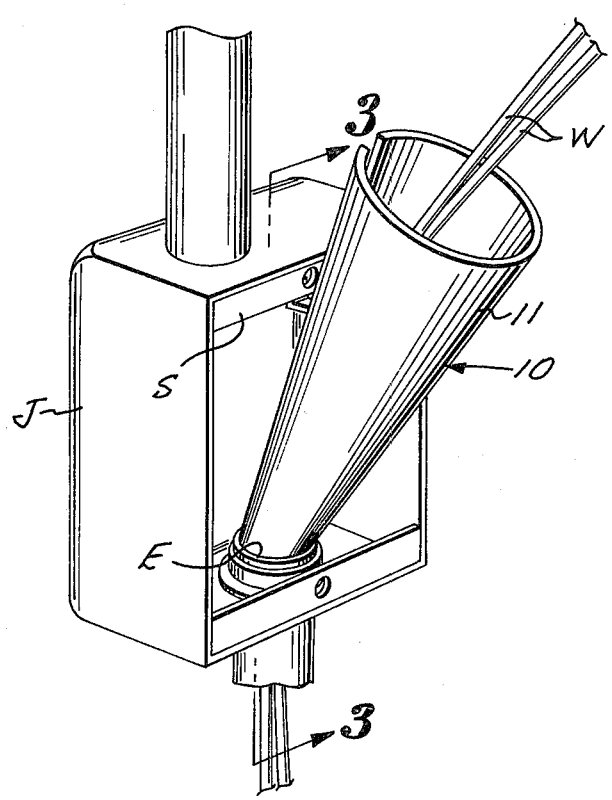
FIG. 2 is a perspective illustration of the wire funnel in FIG. 1 and illustrated in position according to its use.

As shown in FIGS. 1 and 2 the inventive funnel, generally designated by the numeral 10 comprises a sheet plastic surface 11 molded to form a cone split along one tangential line to form two opposed edges 12 and 13. The apex of the cone thus formed is cut off to provide an end opening 14 which is insertable into the conduit end E of a wire conduit C extending into the interior of a junction box J. Formed proximate the edges 12 and 13 and positioned at a location above opening 14 opposing the upper edge of the junction box are two engaging brackets 15 and 16 each formed as a L structure extending vertically on the exterior of surface 11 to provide a lip on each edge for engagement. It is by these brackets that engagement is made with the normally existing plate mounting screw tab T in the junction box J.

It is contemplated to form the foregoing surface 11 with an outward bias, the brackets 15 and 16 being urged apart on installation. By virtue of this bias the surface itself forms the spring for retention. To insure that the split between edges 12 and 13 is minimized particularly at the funnel opening the lips on brackets 15 and 16 are cut on a bias to form tapered edges 17 and 18 the adjacent corners thereof extending beyond the distally opposed ones.

Figure 3:
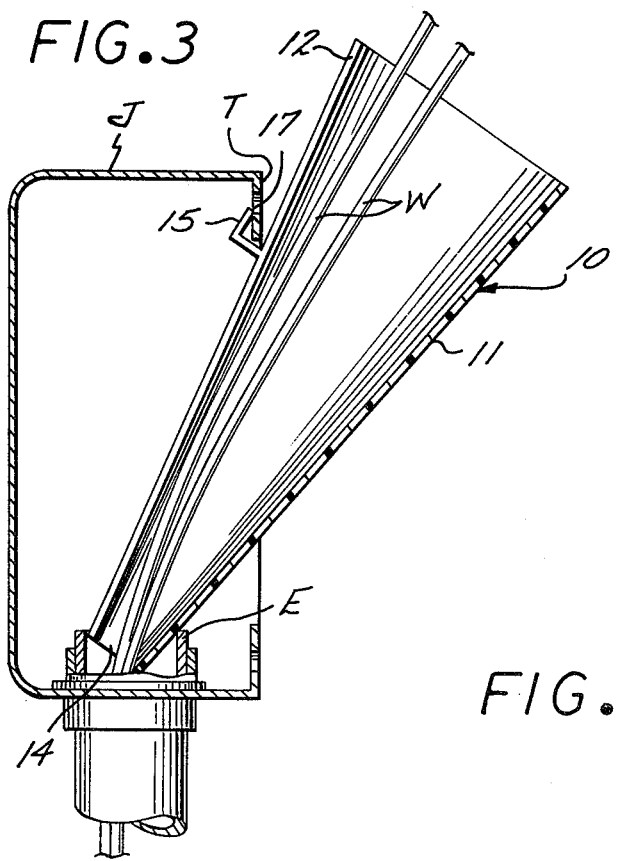
FIG. 3 is a sectional view taken along line 3—3 of FIG. 2.
Figure 4:
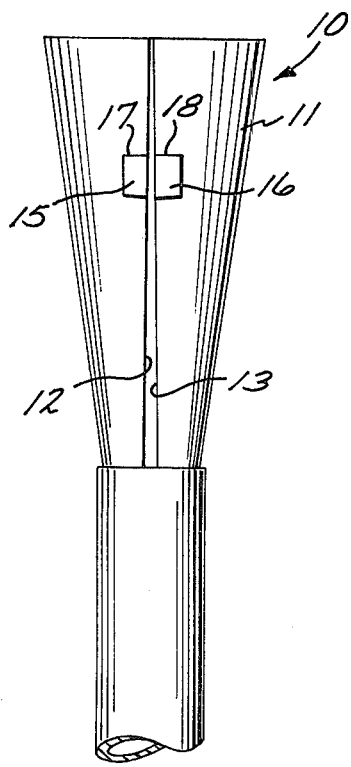
FIG. 4 is a top view illustrating the inserted alignment of the inventive funnel at the end of the conduit.

Thus as shown in FIGS. 3 and 4 when the inventive funnel 10 is located in place edges 17 and 18 are urged to a transverse alignment. The resulting effect closes the periphery of the funnel opening around the wires W, the split between edges 12 and 13 continuously increasing towards opening 14. By virtue of the foregoing dimensions the spring bias of the funnel surface 11 is complemented to slide out of the conduit towards the opposing edge of junction box J. The outward surface bias is of further advantage in providing an enlarged split through which the wire W is received. Thus a one handed operation of closing the split at insertion achieves the engaging sequence, the funnel being self engaging on release.

It is further contemplated to produce the foregoing structure from plastic material like polyethylene, thus rendering a soft sliding surface over which the wire W is drawn. This same material structure provides additional benefits in its simplicity of manufacture and low final cost.

Obviously many modifications may be made to the foregoing description without departing from the spirit of the invention. It is therefore intended that the scope of the invention be determined solely on the claims appended hereto.

What is claimed is:

1. A wire guiding funnel structure adapted for manual installation into a junction box, comprising:
   a flexible substantially triangular planar surface convolved to approximate a cone frustum split along one tangential surface gap, the convolution of said surface being biased outwardly to separate the edges thereof along said gap;
   a first and second engaging bracket formed on the exterior of said surface respectively disposed on the opposing edges along said gap, each said bracket being formed in the manner of a cantelevered L member extending from said surface to align an engaging lip towards the base of said frustum, said engaging lips each being formed along a tapered edge, said taper reducing in the direction away from said gap.

2. Apparatus according to claim 1 wherein:
   said brackets are aligned in opposing alignment across said gap.

3. Apparatus according to claim 2 wherein:
   said surface and said brackets are formed from a plastic material.